(12) United States Patent
Cho et al.

(10) Patent No.: US 8,710,760 B2
(45) Date of Patent: Apr. 29, 2014

(54) POWER SUPPLY APPARATUS FOR LIGHT EMITTING DIODE

(75) Inventors: Kyung Rae Cho, Seoul (KR); Dong Young Huh, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 217 days.

(21) Appl. No.: 13/164,284

(22) Filed: Jun. 20, 2011

(65) Prior Publication Data

US 2012/0019157 A1 Jan. 26, 2012

(30) Foreign Application Priority Data

Jul. 23, 2010 (KR) ........................ 10-2010-0071325

(51) Int. Cl.
*H05B 37/02* (2006.01)

(52) U.S. Cl.
USPC ........ 315/254; 315/200 R; 315/206; 315/278; 363/21.08; 363/21.09; 363/21.16; 363/21.17; 363/95

(58) Field of Classification Search
USPC .......... 363/21.01, 21.07, 21.08, 21.09, 21.15, 363/21.16, 21.17, 95, 97; 323/207, 222, 323/266, 267, 268, 271, 272; 315/200 R, 315/206, 254, 255, 272, 277, 278
See application file for complete search history.

(56) References Cited

U.S. PATENT DOCUMENTS

| | | | |
|---|---|---|---|
| 6,252,783 B1* | 6/2001 | Huh et al. | 363/21.01 |
| 2004/0004446 A1* | 1/2004 | Liu | 315/224 |
| 2008/0266910 A1* | 10/2008 | Kim et al. | 363/21.14 |
| 2009/0251925 A1* | 10/2009 | Usui et al. | 363/16 |
| 2010/0237799 A1* | 9/2010 | Choi et al. | 315/294 |

* cited by examiner

*Primary Examiner* — Douglas W Owens
*Assistant Examiner* — Thai Pham
(74) *Attorney, Agent, or Firm* — Saliwanchik, Lloyd & Eisenschenk

(57) ABSTRACT

A power supply apparatus for LED is provided. The power supply apparatus for LED includes a transformer, a first output unit, and a second output unit. The transformer includes a primary winding, a secondary winding receiving a power induced from the primary winding, and a tertiary winding receiving the power induced from the primary winding. The first output unit is connected to the secondary winding of the transformer, and outputs a first power current to an LED in a first operating condition. The second output unit is connected to the tertiary winding of the transformer, and outputs a second power current to the LED in a second operating condition. When the LED is connected to the power supply apparatus for LED, the power supply apparatus allows a current equal to or less than a predetermined current to flow in the LED, thereby protecting the LED from an overcurrent.

9 Claims, 2 Drawing Sheets

POWER SUPPLY APPARATUS FOR LIGHT EMITTING DIODE

CROSS-REFERENCE TO RELATED APPLICATION

This application claims the benefit under 35 U.S.C. §119 of Korean Patent Application No. 10-2010-0071325, filed Jul. 23, 2010, which is hereby incorporated by reference in its entirety.

BACKGROUND

The present disclosure relates to a power supply apparatus for Light Emitting Diode (LED), and more particularly, to a power supply apparatus for LED, which protects an LED from an overcurrent that is momentarily generated when the LED is connected to the power supply apparatus for LED.

In installing a lighting device, generally, the lighting device is installed in a state where an input power has been disconnected, and thereafter, the power is applied.

However, due to the working environment, a lighting device may be sometimes required to be installed while a power is being supplied continuously. In this case, a power supply apparatus for a lighting device operates in a no-load state.

FIG. 1 is a circuit diagram illustrating a related art power supply apparatus for LED.

As illustrated in FIG. 1, when a lighting device such as an LED 2 is mounted on a power supply apparatus 1 for LED, a high current rapidly flows in the LED 2 because energy stored in the power supply apparatus 1 for LED is momentarily applied to the LED 2 due to the low impedance of the LED 2. Particularly, as the number of LEDs 2 is reduced, a higher surge current flows in the LED 2.

Therefore, a current flowing in the LED 2 is rapidly increased and thus deviates from a normal range, thereby damaging the LED 2. Due to this, the service life of the LED 2 is shortened.

Moreover, when the current deviating from the normal range flows, the current does fatal damage to the power supply apparatus 1 for LED as well as the LED 2, thereby threatening a user's safety.

BRIEF SUMMARY

Embodiments provide a power supply apparatus for LED, which allows a current equal to or less than a predetermined current to flow in an LED through control when the LED is connected to the power supply apparatus for LED, thereby protecting the LED from an overcurrent.

However, the present invention should not be construed as limited to the embodiments set forth herein, and it is intended that the present invention covers the modifications and variations of this invention provided they come within the scope of the appended claims and their equivalents.

In one embodiment, a power supply apparatus for Light Emitting Diode (LED) includes: a transformer including a primary winding, a secondary winding receiving a power induced from the primary winding, and a tertiary winding receiving the power induced from the primary winding; a first output unit connected to the secondary winding of the transformer, and outputting a first power current to an LED in a first operating condition; and a second output unit connected to the tertiary winding of the transformer, and outputting a second power current to the LED in a second operating condition.

The first output unit may include: a first rectifier rectifying a power induced to the secondary winding of the transformer; and a first smoother smoothing the power rectified by the first rectifier to output the first power current.

The second power current may be a power current equal to or lower than a predetermined power current lower than the first power current.

The second operating condition may correspond to a time when the LED is initially connected.

The second output unit may include: a second rectifier rectifying a power induced to the tertiary winding of the transformer; a second smoother smoothing the power rectified by the second rectifier; and a voltage divider voltage-dividing the power smoothed by the second smoother to allow the second power current to flow in the LED.

The second output unit may disconnect an output of the first power current in the second operating condition, and allow the second power current smoothed by the second smoother to be applied to the LED.

The second output unit may further include a first switch turned on or off by the power which is voltage-divided by the voltage divider.

The power supply apparatus may further include: a second switch turned on according to the turned-on of the first switch; a first voltage dropper connected to the second switch in parallel; a second voltage dropper connected to the second switch in series, and connected to the first voltage dropper in parallel; and a third voltage dropper connected in series between the secondary winding of the transformer and the first voltage dropper.

The power supply apparatus may further include: a comparator comparing a reference power and a power, which is voltage-divided by one of the first to third voltage droppers, to output a control signal based on the compared result; and a driver controlling the power, induced to the secondary and tertiary windings of the transformer, according to the control signal outputted from the comparator.

The details of one or more embodiments are set forth in the accompanying drawings and the description below. Other features will be apparent from the description and drawings, and from the claims.

DETAILED DESCRIPTION

Figure 1:
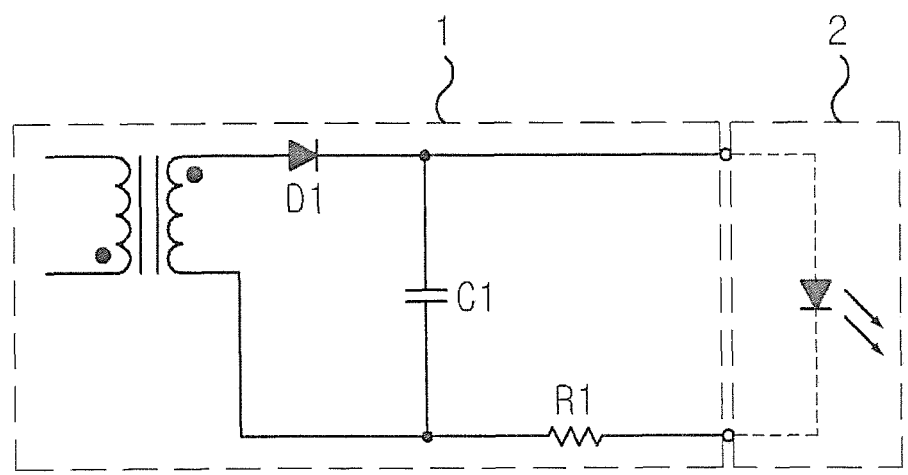
FIG. 1 is a circuit diagram illustrating a related art power supply apparatus for LED.

The present invention may be variously modified and have several embodiments, and thus, specific embodiments are illustrated in drawings and will be described.

Thus, it is intended that the present invention covers the modifications and variations of this invention provided they come within the scope of the appended claims and their equivalents.

Terms like a first and a second may be used to describe various elements, but the elements should not be limited by the terms. The terms may be used only as object for distinguishing an element from another element. For example, without departing from the spirit and scope of the inventive concept, a first element may be referred to as a second element, and similarly, the second element may be referred to as the first element. As used herein, the term and/or includes any and all combinations of one or more of the associated listed items.

It will also be understood that when an element is referred to as being 'on' another element, it can be directly on the other element, or intervening elements may also be present. Further, it will be understood that when an element is referred to as being 'under' another element, it can be directly under, and one or more intervening elements may also be present. In addition, it will also be understood that when an element is referred to as being 'between' two elements, it can be the only element between the two elements, or one or more intervening elements may also be present.

In the following description, the technical terms are used only for explain a specific exemplary embodiment while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Unless terms used in embodiments of the inventive concept are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

Reference will now be made in detail to the embodiments of the present disclosure, examples of which are illustrated in the accompanying drawings. To enable easy understanding in describing the present invention, like reference numerals refer to like elements throughout.

Figure 2:
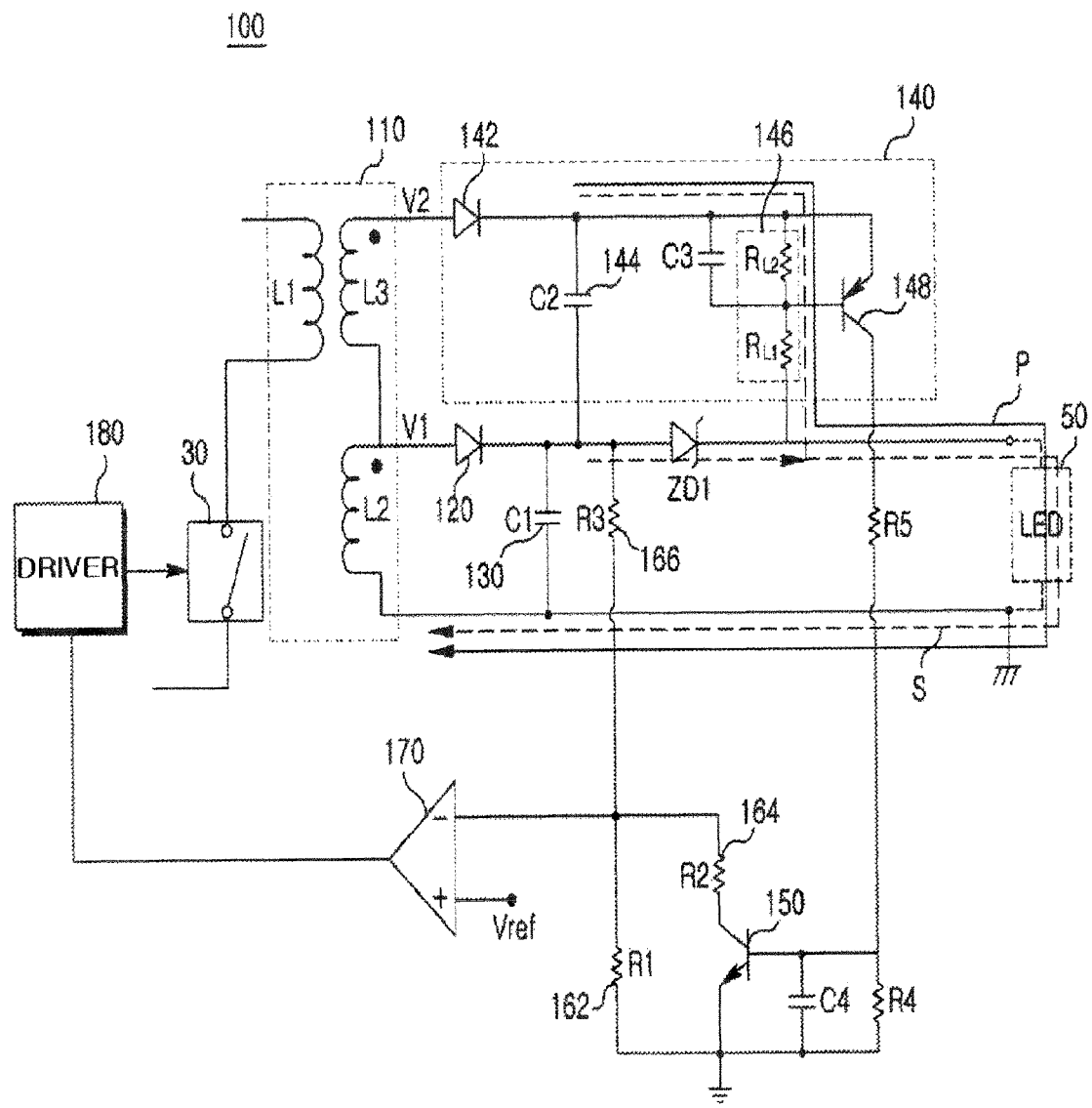
FIG. 2 is a circuit diagram illustrating a power supply apparatus for LED according to an embodiment.

FIG. 2 is a circuit diagram illustrating a power supply apparatus for LED according to an embodiment.

As illustrated in FIG. 2, a power supply apparatus 100 for LED includes a transformer 110, a first rectifier 120, a first smoother 130, a current controller 140, a switch 150, first to third voltage droppers 162, 164 and 166, a comparator 170, and a driver 180.

First, the transformer 110 includes a primary winding L1, a secondary winding L2, and a tertiary winding L3. A voltage is induced from the primary winding L1 to the secondary winding L2 and the tertiary winding L3.

A resonator (not shown) and a switching element 30 are connected to the primary winding L1 of the transformer 110, and thus, when the switching element 30 is turned on, energy is charged by a resonance operation of the resonator. When the switching element 30 is turned off, the charged energy is discharged and induced to the secondary winding L2 and tertiary winding L3 of the transformer 110.

In an embodiment, a turns ratio of each of the secondary and tertiary windings L2 and L3 of the transformer 110 is suitably set such that a power V1 induced to the secondary winding L2 of the transformer 110 is lower by a certain level than the minimum output power of the power supply apparatus 100 for LED, and a power V2 induced to the tertiary winding L3 of the transformer 110 is higher by a certain level than the maximum output power of the power supply apparatus 100 for LED.

The first rectifier 120 is connected to the secondary winding L2 of the transformer 110, and rectifies a power induced to the secondary winding L2 of the transformer 110. That is, the first rectifier 120 allows the induced power current to flow in one direction. The first rectifier 120 is configured with a diode.

The first smoother 130 smoothes the power rectified by the first rectifier 120 and outputs the smoothed power to an LED 50. Herein, the first smoother 130 may be configured with a first capacitor C1. That is, the first smoother 130 stores a power current (i.e., the first smoother 130 is charged with the power current) by a predetermined capacity, and outputs (i.e., discharges) the stored power current to apply the stored power current to the LED 50.

At this point, the first smoother 130 outputs the stored power current to apply the stored power current to the LED 50, in a first operating condition. Herein, the first operating condition is a normal operating condition.

The current controller 140 is connected to the tertiary winding L3 of the transformer 110. When the LED 50 is connected to the power supply apparatus 100 for LED, the current controller 140 disconnects an output of the power current stored in the first smoother 130. That is, when the LED 50 is connected to the power supply apparatus 100 for LED, the current controller 140 allows a power current equal to or less than a predetermined current to be outputted, and performs control such that the power current equal to or less than the predetermined current flows in the connected LED 50.

For this, the current controller 140 includes a second rectifier 142, a second smoother 144, a voltage divider 146, and a control switch 148.

The second rectifier 142 rectifies the power V2 induced to the tertiary winding L3 of the transformer 110 to allow the induced power current to flow in one direction. At this point, the second rectifier 142 may be configured with a diode.

The second smoother 144 smoothes a voltage rectified by the second rectifier 142. Herein, the second smoother 144 is configured with a second capacitor C2. That is, the second smoother 144 stores a power current (i.e., the second smoother 144 is charged with the power current) by a predetermined capacity, and outputs (i.e., discharges) the stored power current to apply the stored power current to the LED 50.

The second smoother 144 is configured to have a capacity smaller than that of the first smoother 130. That is, the capacity of the second smoother 144 is smaller than that of the first smoother 130, and thus, the second smoother 144 stores a smaller amount of current than the amount of a current stored in the first smoother 130. The second smoother 144 applies the stored power current to the LED 50, in a second operating condition. Herein, the second operating condition corresponds to a time when the LED 50 is initially connected.

That is, the power supply apparatus 100 for LED outputs the power current stored in the second smoother 144 in the second operating condition corresponds to a time when the LED 50 is initially connected, but outputs the power current stored in the first smoother 130 in the normal first operating condition.

The voltage divider 146 is a means that voltage-divides a power smoothed by the second smoother 144 and performs control in order for a power current equal to or less than a predetermined current to flow in the connected LED 50, and includes a plurality of voltage dividing resistors (for example, two voltage dividing resistors RL1 and RL2).

To provide a more detailed description, while the power V1 induced to the secondary winding L2 of the transformer 110 is being outputted, when the LED 50 is connected to the power supply apparatus 100 for LED, the LED 50 has a reverse-blocking voltage higher than the power V1 induced to the secondary winding L2 of the transformer 110.

Therefore, the power current stored in the first smoother 130 is not outputted, but the power current stored in the second smoother 144 having a capacity smaller than that of the first smoother 130 is outputted.

The output power current is limited to less than a certain level by the voltage divider 146. Therefore, a very low amount of current flows in the LED 50.

Herein, the power current limited to less than a certain level is a minimum operation current for turning on the switch 150, and the voltage dividing resistors RL1 and RL2 of the voltage divider 146 are set for outputting the minimum operation current.

That is, the voltage dividing resistors RL1 and RL2 configuring the voltage divider 146 may be determined by the minimum operation current of the switch 150.

At this point, by allowing a low current to flow in the LED 50, the power supply apparatus 100 inhibits an overcurrent from flowing in the LED 50, but turns on the switch 150 and thus outputs the minimum power current for conversion to a constant current control mode.

Therefore, in an embodiment, an appropriate value of the second smoother 144 and an appropriate value of the voltage divider 146 are set for satisfying the above-described condition.

The control switch 148 is a switching element that is turned on/off according to a power voltage-divided by the voltage divider 146. The control switch 148 may be configured with a Bipolar Junction Transistor (BJT) or a Metal-Oxide-Semiconductor Field Effect Transistor (MOSFET).

As an example, when the control switch 148 is a BJT, a power current voltage-divided by the voltage divider 146 is applied to a base terminal of the control switch 148, and the control switch 148 is turned on/off according to a voltage difference VBE between the base terminal and an emitter terminal of the control switch 148.

The switch 150 is a switching element that is turned on according to the turned-on of the control switch 148, and may be configured with a BJT or a MOSFET.

As an example, when the switch 150 is a BJT, a current, which flows from the emitter terminal to a collector terminal of the control switch 148 that has been turned on, is applied to a base terminal of the switch 150 and thereby turns on the switch 150.

The first voltage dropper 162 includes a first resistor R1 that is connected to the switch 150 in parallel. The second voltage dropper 164 includes a second resistor R2 that is connected to the switch 150 in series and connected to the first voltage dropper 162 in parallel.

The third voltage dropper 166 includes a third resistor R3 that is serially connected between the secondary winding L2 of the transformer 110 and the first voltage dropper 162.

The comparator 170 compares a voltage-divided power and a reference power Vref by using at least one of the first to third voltage droppers 162, 164 and 166, and outputs a control signal based on the compared result of the voltage-divided power and reference voltage.

To provide a more detailed description, the reference voltage Vref is applied to a positive terminal (+) of the comparator 170, and a voltage-divided power is applied to a negative terminal (−) of the comparator 170 by using at least one of the first to third voltage droppers 162, 164 and 166.

Herein, when the switch 150 is turned off, a voltage controlled by the serially connected first and third voltage droppers 162 and 166 is applied to the positive terminal (+) of the comparator 170. On the other hand, when the switch 150 is turned on, a voltage controlled by the first to third voltage droppers 162, 164 and 166 that are connected in series and parallel is applied to the positive terminal (+) of the comparator 170.

The comparator 170 outputs and delivers a high control signal or a low control signal to the driver 180 according to the compared result, thereby allowing the driver 180 to control the switching element 30.

The driver 180 controls a voltage induce to the secondary and tertiary windings L2 and L3 of the transformer 110 according to the control signal outputted from the comparator 170.

That is, the driver 180 controls a switching operation of the switching element 30, connected to the primary winding L1 of the transformer 110, to control a constant current of the LED 50 according to the control signal outputted from the comparator 170.

Hereinafter, an operation of the power supply apparatus for LED according to an embodiment will be described.

First, in an embodiment, a turns ratio of each of the secondary and tertiary windings L2 and L3 of the transformer 110 is suitably set such that the power V1 induced to the secondary winding L2 of the transformer 110 is lower by a certain level than the minimum output power of the power supply apparatus 100 for LED, and the power V2 induced to the tertiary winding L3 of the transformer 110 is higher by a certain level than the maximum output power of the power supply apparatus 100 for LED.

The second smoother 144 is configured to have a capacity smaller than that of the first smoother 130, and thus, the second smoother 144 stores a smaller amount of current than the amount of a current stored in the first smoother 130.

While the power V1 induced to the secondary winding L2 of the transformer 110 is being outputted, when the LED 50 is connected to the power supply apparatus 100 for LED, the LED 50 has a reverse-blocking voltage higher than the power V1 induced to the secondary winding L2 of the transformer 110.

Therefore, as in a line P, the power current stored in the first smoother 130 is not outputted, but the power current stored in the second smoother 144 having a capacity smaller than that of the first smoother 130 is outputted.

Since the output power current is limited to less than a certain level by the voltage divider 146, a very low amount of current flows in the LED 50.

Herein, the power current limited to less than a certain level is a minimum operation current for turning on the switch 150, and the voltage dividing resistors RL1 and RL2 of the voltage divider 146 are set for outputting the minimum operation current. The reason of outputting the minimum operating current is for inhibiting an overcurrent from flowing in the LED 50 by allowing a low current to flow in the LED 50, and turning on the switch 150 to enter into a constant current control mode.

Therefore, in an embodiment, an appropriate value of the second smoother 144 and an appropriate value of the voltage divider 146 are set for satisfying the above-described condition.

The control switch 148, receiving a power current that is limited to less than a certain level by the voltage divider 146, is turned on, and moreover, the switch 150 is turned on according to the turned-on of the control switch 148.

The reference power Vref is applied to the positive terminal (+) of the comparator 170, and a voltage-divided power is applied to the negative terminal (−) of the comparator 170 by using at least one of the first to third voltage droppers 162, 164 and 166.

The comparator 170 outputs a high control signal or a low control signal according to the compared result of the applied powers.

Subsequently, the switching element 30 connected to the primary winding L1 of the transformer 110 is turned on/off according to the control of the driver 180. Also, the power V1 induced to the secondary winding L2 of the transformer 110 is progressively increased by the operation of the switching element 30, and thus, a current flows as in a line S. Therefore, the power supply apparatus 100 naturally enters into the constant control mode to control a constant current.

In the power supply apparatus for LED according to an embodiment, as described above, when the LED is connected to the power supply apparatus for LED, the LED can be protected from an overcurrent by allowing a current equal to or less than a predetermined current to flow in the LED.

That is, when the LED is connected to the power supply apparatus for LED, by performing control such that a power equal to or less than a predetermined current is outputted from the second smoother connected to an auxiliary winding (i.e., the tertiary winding) of the transformer instead of the first smoother that outputs a power to the LED for driving of the LED, the power equal to or less than the predetermined current is controlled to flow in the LED.

Accordingly, the damage of the LED can be inhibited, and thus, the service life of the LED can be extended.

Moreover, the damage of the power supply apparatus for LED can be inhibited, and thus, a user's safety can be guaranteed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power supply apparatus for Light Emitting Diode (LED) comprising:
   a transformer comprising a primary winding, a secondary winding receiving a power induced from the primary winding, and a tertiary winding receiving the power induced from the primary winding;
   a first output unit connected to the secondary winding of the transformer, and outputting a first power current to an LED; and
   a second output unit connected to the tertiary winding of the transformer, and outputting a second power current to the LED;
   wherein the LED is simultaneously connected to both the first output unit and the second output unit,
   wherein the first power current is applied to the LED in a first operating condition and the second power current is applied to the LED in a second operating condition, and
   wherein a turns ratio of each of the secondary and tertiary winding is set such that a first power induced to the secondary winding is lower than a minimum output power of the primary winding and a second power induced to the tertiary winding is higher than a maximum output power of the primary winding.

2. The power supply apparatus according to claim 1, wherein the first output unit comprises:
   a first rectifier rectifying a power induced to the secondary winding of the transformer; and
   a first smoother smoothing the power rectified by the first rectifier to output the first power current.

3. The power supply apparatus according to claim 1, wherein the second power current is a power current equal to or lower than a predetermined power current lower than the first power current.

4. The power supply apparatus according to claim 1, wherein the second operating condition corresponds to a time when the LED is initially connected.

5. The power supply apparatus according to claim 2, wherein the second output unit comprises:
   a second rectifier rectifying a power induced to the tertiary winding of the transformer;
   a second smoother smoothing the power rectified by the second rectifier; and
   a voltage divider dividing the power smoothed by the second smoother to allow the second power current to flow in the LED.

6. The power supply apparatus according to claim 5, wherein the second output unit disconnects an output of the first power current in the second operating condition, and allows the second power current smoothed by the second smoother to be applied to the LED.

7. The power supply apparatus according to claim 5, wherein the second output unit further comprises a first switch turned on or off by the power which is voltage-divided by the voltage divider.

8. The power supply apparatus according to claim 7, further comprising:
   a second switch turned on according to the turned-on of the first switch;
   a first voltage dropper connected to the second switch in parallel;
   a second voltage dropper connected to the second switch in series, and connected to the first voltage dropper in parallel; and
   a third voltage dropper connected in series between the secondary winding of the transformer and the first voltage dropper.

9. The power supply apparatus according to claim 8, further comprising:
   a comparator comparing a reference power and a power, which is voltage-divided by one of the first to third voltage droppers, to output a control signal based on the compared result; and
   a driver controlling the power, induced to the secondary and tertiary windings of the transformer, according to the control signal outputted from the comparator.

* * * * *